United States Patent
Betser et al.

(10) Patent No.: US 11,422,957 B2
(45) Date of Patent: *Aug. 23, 2022

(54) MULTI-PORTED NONVOLATILE MEMORY DEVICE WITH BANK ALLOCATION AND RELATED SYSTEMS AND METHODS

(71) Applicant: Cypress Semiconductor Corporation, San Jose, CA (US)

(72) Inventors: Yoram Betser, Mazkeret Batya (IL); Cliff Zitlaw, San Jose, CA (US); Stephan Rosner, Campbell, CA (US); Kobi Danon, Te-Aviv (IL); Amir Rochman, Tel-aviv (IL)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,460

(22) Filed: May 21, 2021

(65) Prior Publication Data

US 2021/0349839 A1 Nov. 11, 2021

Related U.S. Application Data

(63) Continuation of application No. 16/719,493, filed on Dec. 18, 2019, now Pat. No. 11,030,128.

(60) Provisional application No. 62/882,932, filed on Aug. 5, 2019.

(51) Int. Cl.
*G06F 13/16* (2006.01)
*G06F 13/42* (2006.01)

(52) U.S. Cl.
CPC ...... *G06F 13/1668* (2013.01); *G06F 13/4234* (2013.01); *G06F 13/4291* (2013.01); *G06F 2213/0002* (2013.01); *G06F 2213/0004* (2013.01)

(58) Field of Classification Search
CPC ............ G06F 13/1668; G06F 13/4234; G06F 13/4291
See application file for complete search history.

(56) References Cited

U.S. PATENT DOCUMENTS

| 4,937,781 | A | * | 6/1990 | Lee | ......................... G06F 13/18 |
| | | | | | 711/149 |
| 11,030,128 | B2 | * | 6/2021 | Betser | ................. G06F 13/1668 |
| 2004/0098545 | A1 | * | 5/2004 | Pline | ................... G06F 13/1684 |
| | | | | | 711/115 |
| 2006/0168417 | A1 | * | 7/2006 | Loffler | ................ G06F 12/0207 |
| | | | | | 711/E12.003 |
| 2007/0115743 | A1 | * | 5/2007 | Sartori | ................... G11C 16/26 |
| | | | | | 365/221 |

(Continued)

*Primary Examiner* — Phong H Dang

(57) ABSTRACT

A memory device that includes a first port and a second port. The first port includes a first clock input, at least one first command address input, and at least one data input or output configured to transfer data in relation to the memory device. The second port includes a second clock input and at least one command, address, and data input/output (I/O) configured to receive command and address information from, and to transfer data in relation to the memory device. The memory device also includes a plurality of memory banks, in which two different memory banks may be accessed respectively by the first and the second ports concurrently. Other embodiments of the memory device and related methods and systems are also disclosed.

20 Claims, 14 Drawing Sheets

(56) References Cited

U.S. PATENT DOCUMENTS

| | | | | |
|---|---|---|---|---|
| 2008/0263287 | A1* | 10/2008 | Kim | G11C 8/16 |
| | | | | 711/149 |
| 2009/0150621 | A1* | 6/2009 | Lee | G11C 8/16 |
| | | | | 711/149 |
| 2010/0095089 | A1* | 4/2010 | Kwon | G06F 15/167 |
| | | | | 711/149 |
| 2012/0017035 | A1* | 1/2012 | Tateno | G06F 12/0246 |
| | | | | 711/E12.008 |
| 2015/0317277 | A1* | 11/2015 | Wang | G06F 1/10 |
| | | | | 710/313 |
| 2017/0160928 | A1* | 6/2017 | Jaffari | G06F 3/0658 |
| 2017/0357560 | A1* | 12/2017 | Fukuda | G06F 11/14 |
| 2019/0012436 | A1* | 1/2019 | Liu | G06F 21/10 |
| 2019/0098747 | A1* | 3/2019 | Ho | G06F 13/4072 |
| 2021/0042054 | A1* | 2/2021 | Van Antwerpen | G11C 16/26 |

* cited by examiner

| COMMAND | CS | COMMAND/ADD BUS | | | | | | CK |
|---|---|---|---|---|---|---|---|---|
| | | CA0 | CA1 | CA2 | CA3 | CA4 | CA5 | |
| Activate1 | H | H | L | R12 | R13 | R14 | R15 | 1 |
| | L | BA0 | BA1 | BA2 | V | R10 | R11 | 2 |
| Activate2 | H | H | H | R6 | R7 | R8 | R9 | 1 |
| | L | R0 | R1 | R2 | R3 | R4 | R5 | 2 |
| Read-1 | H | L | H | L | L | L | BL | 1 |
| | L | BA0 | BA1 | BA2 | V | C9 | AP | 2 |
| CAS-2 | H | L | H | L | L | H | C8 | 1 |
| | L | C2 | C3 | C4 | C5 | C6 | C7 | 2 |

| COMMAND | CS | COMMAND/ADD BUS | | | | | | CK |
|---|---|---|---|---|---|---|---|---|
| | | CA0 | CA1 | CA2 | CA3 | CA4 | CA5 | |
| NVR-1 | H | H | A20 | A21 | A22 | A23 | A24 | 1 |
| | L | A14 | A15 | A16 | A17 | A18 | A19 | 2 |
| NVR-2 | H | H | A9 | A10 | A11 | A12 | A13 | 1 |
| | L | A3 | A4 | A5 | A6 | A7 | A8 | 2 |

| COMMAND | CS | COMMAND/ADD BUS | | | | | | CK |
|---|---|---|---|---|---|---|---|---|
| | | CA0 | CA1 | CA2 | CA3 | CA4 | CA5 | |
| Multi-Purpose | H | L | L | L | L | L | OP6 | 1 |
| | L | OP0 | OP1 | OP2 | OP3 | OP4 | OP5 | 2 |
| Mode Reg. Write-1 | H | L | H | H | L | L | OP7 | 1 |
| | L | MA0 | MA1 | MA2 | MA3 | MA4 | MA5 | 2 |
| Mode Reg. Write-2 | H | L | H | H | L | H | OP6 | 1 |
| | L | OP0 | OP1 | OP2 | OP3 | OP4 | OP5 | 2 |
| Mode Reg. Read-1 | H | L | H | H | H | L | V | 1 |
| | L | MA0 | MA1 | MA2 | MA3 | MA4 | MA5 | 2 |

| FIELD | TYPE | DEFAULT | DEFINITION |
|---|---|---|---|
| Bank 0 Accessibility | R/W | 0 | 0b: SPI Accessible, 1b: LPDDR4 Accessible |
| Bank 1 Accessibility | R/W | 0 | 0b: SPI Accessible, 1b: LPDDR4 Accessible |
| Bank 2 Accessibility | R/W | 0 | 0b: SPI Accessible, 1b: LPDDR4 Accessible |
| Bank 3 Accessibility | R/W | 0 | 0b: SPI Accessible, 1b: LPDDR4 Accessible |
| Bank 4 Accessibility | R/W | 0 | 0b: SPI Accessible, 1b: LPDDR4 Accessible |
| Bank 5 Accessibility | R/W | 0 | 0b: SPI Accessible, 1b: LPDDR4 Accessible |
| Bank 6 Accessibility | R/W | 0 | 0b: SPI Accessible, 1b: LPDDR4 Accessible |
| Bank 7 Accessibility | R/W | 0 | 0b: SPI Accessible, 1b: LPDDR4 Accessible |

FIG. 7

MULTI-PORTED NONVOLATILE MEMORY DEVICE WITH BANK ALLOCATION AND RELATED SYSTEMS AND METHODS

RELATED APPLICATIONS

This application is a continuation of U.S. non-provisional patent application having Ser. No. 16/719,493, filed on Dec. 18, 2019, which claims the benefit of U.S. provisional patent application having Ser. No. 62/882,932, filed on Aug. 5, 2019, all of which are incorporated by reference herein in their entirety.

TECHNICAL FIELD

The present disclosure relates generally to nonvolatile memory devices, and more particularly to nonvolatile memory devices having multiple banks that can be accessed by multiple, heterogenous ports.

BACKGROUND

Nonvolatile memory (NVM) devices can advantageously store data in the absence of power. As such, NVM devices enjoy wide application in portable and industrial devices. One such application can be as memory in automobile or other transportation devices.

A drawback to conventional NVM devices can be access speeds, particularly read data rates. Conventional NVM devices are typically fabricated with serial data interfaces, which can limit an overall rate at which data can be read from an NVM device.

BRIEF DESCRIPTION OF THE DRAWINGS

FIG. 5 is a table showing conventional LPDDR4 commands.

FIG. 6A is a table showing custom read commands that can be received and processed by an NVM device over an LPDDR4 interface according to an embodiment.

FIG. 6B is a table showing conventional LPDDR4 commands that can be received and processed by an NVM device according to an embodiment.

FIG. 7 is a table showing a bank access register according to an embodiment.

DETAILED DESCRIPTION

Figure 1A:
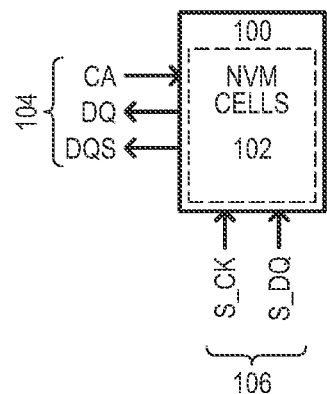
FIGS. 1A to 1C are diagrams showing a nonvolatile memory (NVM) device and data access operations according to an embodiment.

According to embodiments a nonvolatile memory (NVM) device can include multiple banks of nonvolatile memory cells which can be accessed by heterogenous ports or interfaces (I/Fs). A first port can provide data throughput at relatively higher data rate with respect to a second port. In some embodiments, a first port can be a read-only port while a second port can be a read-write (e.g., program) port. In some embodiments, while one bank is accessed via one port, another bank can be accessed by a different port.

According to embodiments, a first port of a NVM device can be a double data rate (DDR) interface that can process commands compatible with a standard interface. Further, the DDR interface can process custom commands that can provide rapid NVM bank accesses. In some embodiments, a DDR interface can be compatible with a low power DDR interface (LPDDR) standard promulgated by JEDEC, but also provide access via custom commands that are not part of the LPDDR standard.

In the various embodiments below, like items are referred to by the same reference characters, but with the leading digit(s) corresponding to the figure number.

FIG. 1A is a block diagram of a NVM device 100 according to an embodiment. NVM device 100 can include NVM cells 102, a first port 104 and a second port 106. NVM memory cells 102 can be any suitable type of nonvolatile memory cell that stores data in a nonvolatile fashion. In some embodiments, NVM memory cells can be "flash" type memory cells having a NOR type architecture.

A first port 104 can be a parallel port that can output data in parallel fashion in response to command and address data. A first port 104 can include a command address (CA) input, a parallel data (DQ) output, and a data clock (DQS) output. A CA input can include a number of inputs for receiving command and address data as a sequence of parallel bit values. A DQS output can provide a data clock. A DQ output include a number of unidirectional data outputs that can provide output data in parallel (e.g., bytes, words, double-words, etc.).

In some embodiments, a first port 104 can be compatible with some operations of an existing double data rate (DDR) standard, but capable of processing or executing write operations. In some embodiments a first port 104 can be compatible with some operations of the LPDDR4 standard promulgated by JEDEC, but not necessarily all operations. For example, in some embodiments write operations are not supported. However, in alternate embodiments a first port 104 can be a read/write port, and write operations and/or register set operations can be supported. In addition, a first port 104 can be compatible with custom read commands that are not part of the LPDDR4 standard.

A second port 106 can be a serial port that can transmit command, address, and data in a serial fashion on one or more serial data input and/or outputs (I/Os). A serial port 106 can include a serial clock (S_CK) input and one or more serial data I/Os (S_DQ). In some embodiments, a second port 106 can be compatible with a Serial Peripheral Interface (SPI) standards.

A first port 104 can provide a higher data throughput than a second port 106. Accordingly, data can be read from NVM cells 102 at a relatively high data rate via the first port, while data can be both read and written (e.g., programmed, erased) via the second port 106.

In some embodiments, a NVM device 100 can be formed in a single integrated circuit package. In more particular embodiments, a NVM device can be a single integrated circuit device having circuits formed with a single integrated circuit substrate.

Figure 1B:
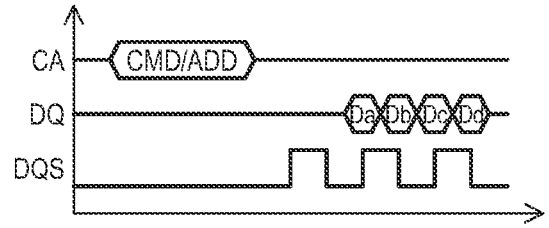

FIG. 1B is a timing diagram showing access operations at a first port 104 of NVM device 100 shown in FIG. 1A. Command and address data (CMD/ADD) can be received at CA input as a sequence of parallel bits. In some embodiments, first port 104 does not service write operations and DQ is a unidirectional port (i.e., outputs read data but does not receive write data). Following a read command and address data, a DQS output can provide a data clock signal. DQ can provide data in parallel on consecutive rising and falling transitions of DQS data clock signal.

Figure 1C:
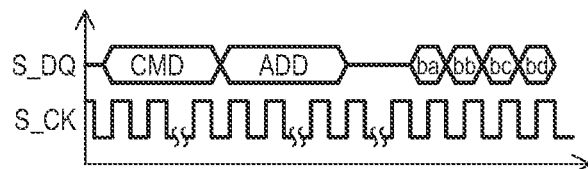

FIG. 1C is a timing diagram showing access operations at a second port 106 of NVM device 100 shown in FIG. 1A. Command and address data (CMD/ADD) can be received on a serial data I/O (S_DQ). Subsequently, read data can be output or write data can be driven on the same or a different serial data I/O. On a serial data I/O bit values are provided in synchronism with serial clock S_CK. While FIG. 1C shows one serial I/O, alternate embodiments can include more than one serial I/O.

While embodiments show DDR type parallel ports, alternate embodiments can include single data rate type parallel ports. Further, either or both ports of a NVM device can be compatible with any suitable DRAM interface, including but not limited to SDRAM, DDR1, DDR2, DDR3, and other implementation of DDR4.

Figure 2:
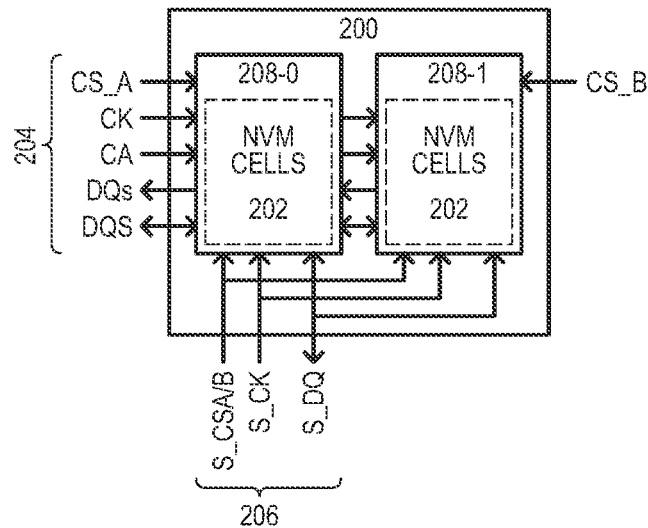
FIG. 2 is a diagram showing a NVM device having multiple dice according to an embodiment.

FIG. 2 is a block diagram of a NVM device 200 according to another embodiment. NVM device 200 can include items like those shown in FIG. 1A. NVM device 200 can be one implementation of that shown in FIG. 1A. FIG. 2 differs from FIG. 1A in that the NVM device 200 is shown to include multiple dice (two shown as 208-0 and 208-1. However, other embodiments can include fewer or greater numbers of dice). Each die 208-0/1 can be accessed by a first port 204 and second port 206.

A first port 204 can be a parallel port and a second port 206 can be a serial port. Accesses can occur as in the case of FIGS. 1A to 1C, with a specific die being selected by operation of a chip select input. In particular, for accesses via first port 204, chip select signal CS_A can select die 208-0 for possible access and chip select signal CS_B can select die 208-1 for possible access. In addition, CA input can be entered in synchronism with input clock CK. For accesses via second port 206, chip select signals S_CSA and S_CSB can select between dice 208-0 and 208-1 for possible access.

Figure 3A:
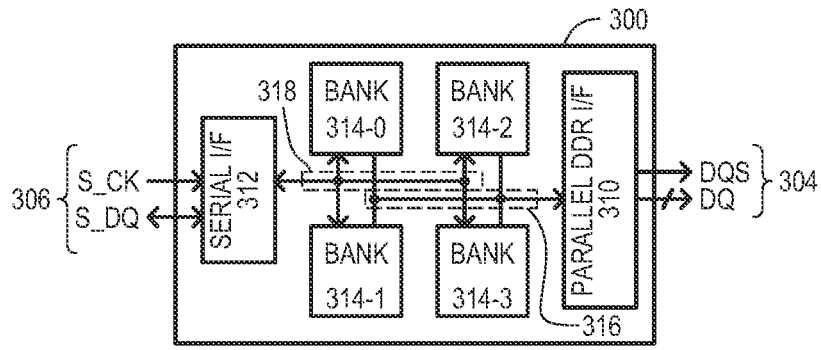
FIGS. 3A to 3C are block diagrams showing a NVM device having multiple banks that can be simultaneously accessed via a serial and parallel port according to embodiments.

FIG. 3A is a block diagram of a NVM device 300 according to another embodiment. NVM device 300 can be one implementation of that shown in FIG. 1A. A NVM device 300 can include a first port 304, a second port 306, a first interface (I/F) 310, a second I/F 312, and a number of separately addressable banks 314-0 to -3. A first I/F 310 can be a parallel DDR I/F which can provide parallel output data on data output DQ in synchronism with rising and falling edges of a data clock DQS. In some embodiments, a first I/F 310 is not capable of processing write requests. A first I/F 310 can be compatible with the LPDDR4 standard (but may not process LPDDR4 write requests). A first I/F 310 can also process custom read commands that are not part of the LPDDR4 standard.

A second I/F 312 can be a serial I/F which can enable serial data transactions on one or more serial data I/Os (S_DQ) in synchronism with a serial clock S_CK. In some embodiments, a second I/F 312 can be compatible with the SPI standard, including processing serial read and write (e.g., program, erase) commands.

Banks (314-0 to -3) can each include a number of NVM cells. Within each bank (314-0 to -3) NVM cells can be arranged into one or more arrays, and accessible by row and column addresses. NVM cells can take any suitable form, and in some embodiments can be "flash" type NVM cells. Banks (314-0 to -3) can be separately addressable. That is, a physical addressing of device 300 can have a separate bank address for each bank (314-0 to -3). All banks (314-0 to -3) can be connected to a first bus system 316 and a second bus system 318. First bus system 316 can connect banks (314-0 to -3) to first I/F 310. Second bus system 318 can connect banks (314-0 to -3) to second I/F 312. While FIG. 3A shows a device with four banks, embodiments can include greater or fewer numbers of banks.

Figure 3B:
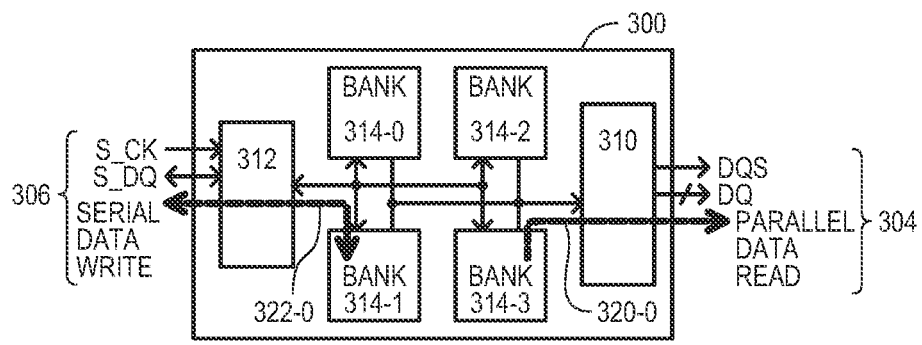
Figure 3C:
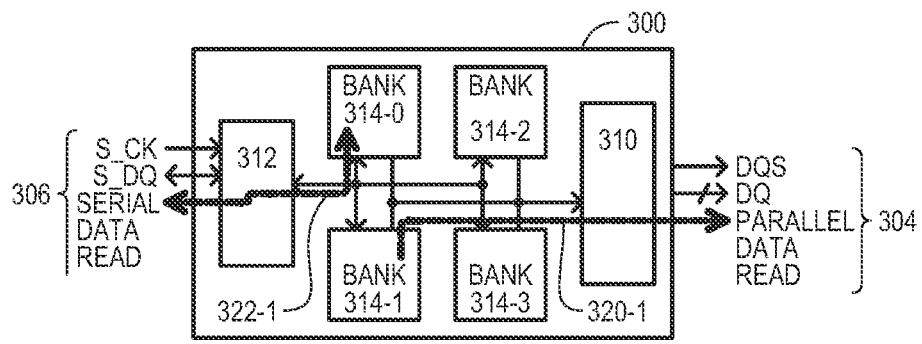

FIGS. 3B and 3C are block diagrams showing how separately addressable banks (314-0 to -3) can be accessed by different ports at the same time. FIG. 3B shows a first port transaction 320-0 occurring at the same time as a second port transaction 322-0. A first port transaction 320-0 can be a reading of data from bank 314-3 to output data in parallel on first port 304. A second port transaction 322-0 can be a reading of data from or a writing of data into bank 314-1 via second port 306. FIG. 3C shows another example of a first port transaction 320-1 and a second port transaction 322-1 that are directed to different banks, and so can occur at the same time.

In some embodiments, accesses to a same bank (314-0 to -3) by both ports 304/306 at the same time is not allowed. In some embodiments, each bank (314-0 to -3) can be dynamically designated to one port (304 or 306). If a bank (314-0 to -3) is designated to one port, the bank cannot be accessed by the other port.

Figure 3D:
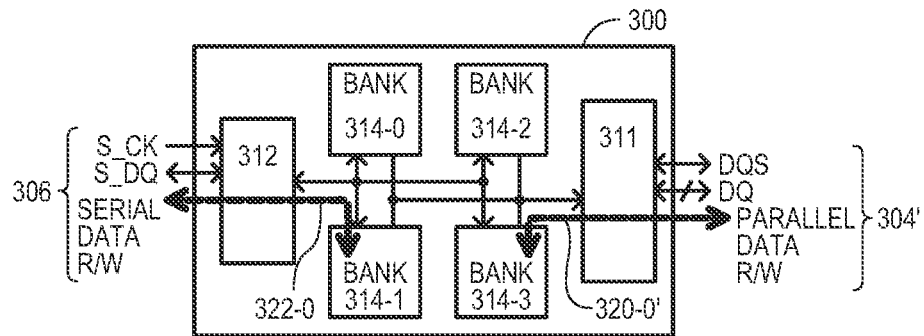
FIGS. 3D to 3F are block diagrams showing NVM devices with various port configurations as well as bank access control operations.

While embodiments have shown NVM devices with particular port types (i.e., serial and parallel), alternate embodiments can include ports of any other suitable type. As but one of many possible alternates embodiments, FIG. 3D shows a NVM device 300 in which a first port 304' can also be a write port. In FIG. 3D, items like those of FIG. 3A are shown with the same reference characters. A first interface 311 can include write (including program) circuits to enable write operations from first port 304'. A first port transaction 320-0' can be a read or write at bank 314-3. A second port transaction 322-0 can be a read or write at bank 314-1 via second port 306. FIG. 3D shows another example of a first port transaction 320-0' and a second port transaction 322-1 that are directed to different banks, and so can occur at the same time. Referring still to FIG. 3D, a second port 306 may be a read-only port or may also be a read-write port. While FIG. 3D shows a first port 304 as being a parallel, in alternate embodiments it may be a different type of port, including a serial port as but one example.

Figure 3E:
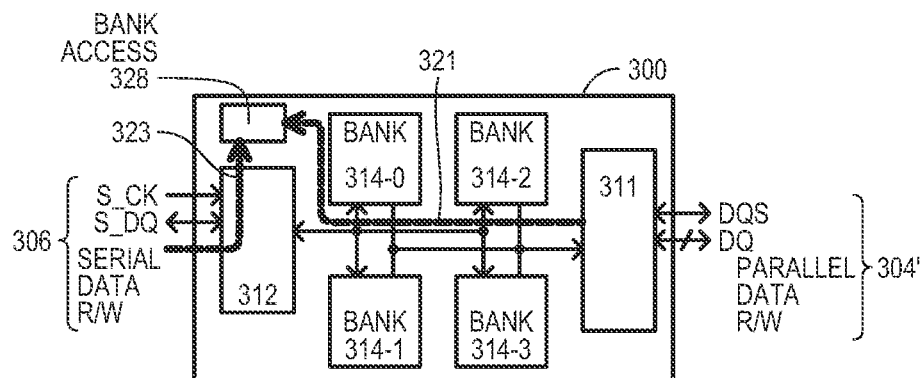

FIG. 3E shows bank access configuration operations according to embodiments. In FIG. 3E, items like those of FIG. 3D are shown with the same reference characters. FIG. 3E also shows bank access circuits 328. Bank access circuits 328 can control which port(s) (304' or 306) have access to a particular bank (314-0 to -3). According to embodiments, access to banks (314-0 to -3) can be set by a bank access setting operation 323 conducted via second port 306. In addition or alternatively, access to banks (314-0 to -3) can be set by a bank access setting operation 321 conducted via first port 304. In some embodiments, a first and/or second I/F 310/311 can process register write commands compatible with an existing standard to set bank accesses. In addition or alternatively, first and/or second I/F 310/311 can process custom bank configuration commands that are not part of any standard.

Figure 3F:
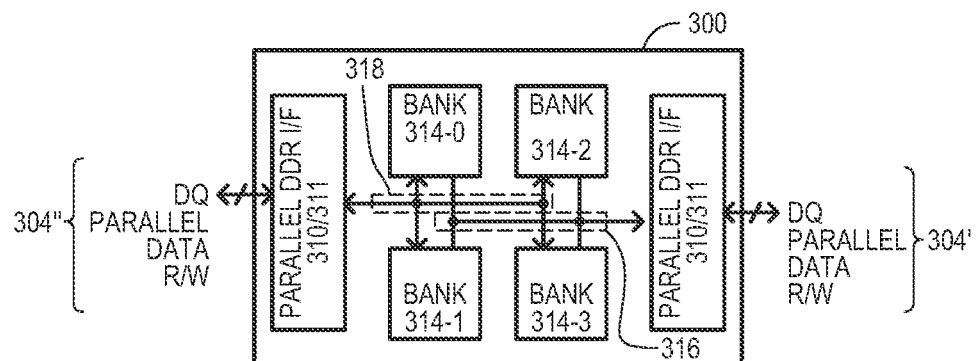

FIG. 3F shows a NVM device 300 according to various other embodiments. In FIG. 3F, items like those of FIG. 3A are shown with the same reference characters. In the embodiment shown, both a first port 304' and second port 304" can be parallel ports. A first port 304' can be a read or read-write port. A second port 304" can be a read or read-write port.

Figure 4:
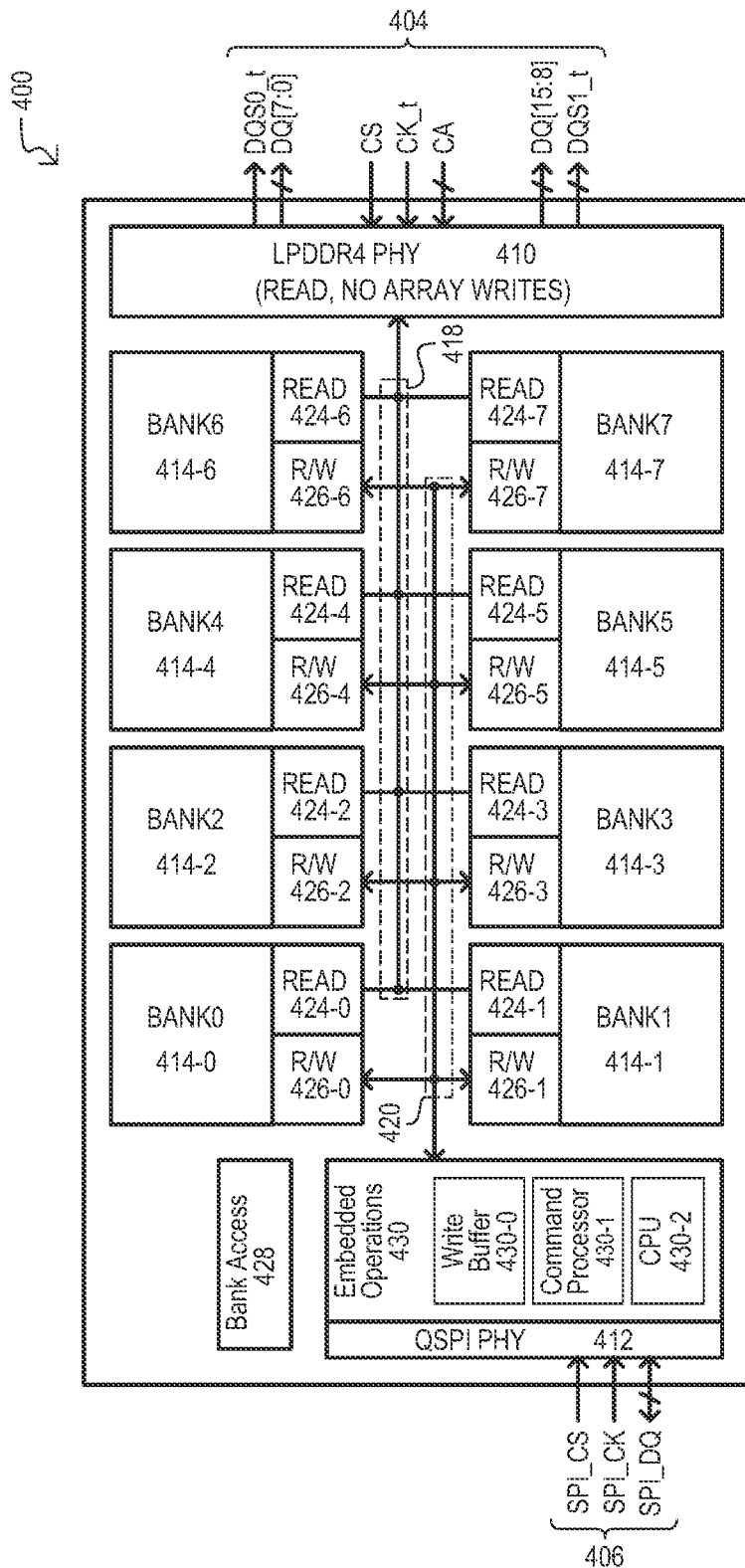
FIG. 4 is a block diagram of a NVM device having a LPDDR4 compatible port, Serial Peripheral Interface (SPI) compatible port, and separately accessible banks according to an embodiment.

FIG. 4 is a block diagram of a NVM device 400 according to a further embodiment. NVM device 400 can be one implementation of that shown in FIG. 1A. NVM device 400 can include a LPDDR4 compatible port 404, a quad SPI (QSPI) compatible port 406, a LPDDR4 compatible physical layer interface (PHY) (referred to as LPDDR4 PHY) 410, a QSPI compatible PHY (referred to as QSPI PHY) 412, multiple banks 414-0 to -7, a first access path 424-0 to -7 for each bank (424-0 to -7), a second access path 426-0 to -7 for each bank (426-0 to -7), a bank access register 428, and an embedded operations section 430.

LPDDR4 compatible port 404 can include a chip select CS, clock input CK_t, command address CA input, a first data output DQ[7:0] with corresponding data clock output DQS0_t, and a second data output DQ[15:8] with corresponding data clock output DQS1_t.

LPDDR4 PHY 410 can process commands received over port 404, including LPDDR4 compatible commands. In some embodiments, LPDDR4 PHY 410 can process some LPDDR4 compatible commands, but not process LPDDR4 write commands. LPDDR4 PHY 410 can be connected to the banks (414-0 to -7) via first bus system 418. A read data transfer rate via LPDDR4 PHY 410 can be faster than that of QSPI PHY 412. In some embodiments, LPDDR4 PHY 410 can be in communication with embedded operations section 430 to signal access requests to from LPDDR4 port 404.

QSPI compatible port 406 can include a serial chip select SPI_CS, a serial clock input SPI_CK, and four serial data I/Os SPI_DQ. QSPI PHY 412 can process commands received over port 406, including QSPI compatible commands. Such commands can include both read and write (e.g., program) commands.

A bank access register 428 can store bank access data for each bank (414-0 to -7) that can control port access to the bank. In some embodiments, if bank access data for a bank (414-0 to -7) has one value, the bank can be accessed by QSPI port 406 and not accessed by the LPDDR4 port 404. If bank access data has another value, the bank can be accessed by LPDDR4 port 404 and not accessed by the QSPI port 406.

Each bank (414-0 to -7) can include NVM cells arranged into rows and columns, and can be separately accessible via a unique bank address. In some embodiments, NVM cells can be group erasable (e.g., flash type cells). Read paths (424-0 to -7) can enable read accesses to their corresponding bank (414-0 to -7) from LPDDR4 port 404 via first bus system 416. R/W paths (426-0 to -7) can enable read or write accesses to their corresponding bank (414-0 to -7) from QSPI port 406 via second bus system 418. In some embodiments, read paths (424-0 to -7) and R/W paths (426-0 to -7) can be enabled or disabled according to bank access values.

As in the case of FIG. 3A to 3C, different banks (414-0 to -7) can be accessed at the same time from different ports 404/406. However, a same bank (414-0 to -7) may not be accessed at the same time from both ports 404/406.

Embedded operations section 430 can include a write buffer 430-0, command processor 430-1 and processor section 430-2. A write buffer 430-0 can receive and store write data from QSPI port 406 for subsequent programming into an addressed bank (414-0 to -7). A command processor 430-1 can decode command data received on QSPI port 406 and generate appropriate control signals to execute the command. A processor section 430-2 can include one or more central processing units (CPUs) to execute various functions for the NVM device 400. Such functions can include setting bank access values in response to commands received at first and second ports 404 and 406. Further, processor section 430-2 can form any of: maintenance NVM cells (e.g., wear leveling), sector access control (boot sectors), encryption/decryption, as but a few examples.

FIG. 5 is a table 550 showing conventional LPDDR4 commands for reading data from a memory device. Table 550 includes columns COMMAND that identifies a type of command, CS which identifies a chip select value, command/address bus values (CA0 to CA5) and clock values CK. As shown, each command includes a set of bit values applied on a first clock transition (CK=1) and the immediately following next clock transition (CK=2) of the same type (e.g., rising edge). A conventional LPDDR4 read operation involves the four commands shown in the vertical order (i.e., Activate-1-Activate-2-Read-1-CAS-2). That is, a conventional LPDDR4 read access includes four commands, with each command occupying two clock cycles.

According to embodiments, a NVM device can employ a DDR interface compatible with an existing standard. However, the interface can process a faster sequence of commands to enable a read access. That is, if a DDR standard dictates N commands for a read access, an NVM device according to an embodiment can enable a read access in M commands, where M<N.

One particular example of such an embodiment is shown in FIG. 6A. FIG. 6A is a table 650 shows a command sequence of accessing NVM cells (e.g., a bank) that includes only two commands: NVR-1 and NVR-2. Table 650 includes the same columns as shown in FIG. 5. Such commands can be received on a LPDDR4 compatible port and take the general form of an LPDDR4 command. However, NVR-1 and NVR-2 are not part of the LPDDR4 standard. Such a read access is in contrast to the conventional read access shown in FIG. 5, which requires four commands.

In the particular embodiment shown, a first command NVR-1 can include higher order address values (e.g., bank and row values), while a second command NVR-2 can include lower order address values (e.g., row and column values). However, the particular bit format of the commands should not be construed as limiting.

According to embodiments, while an NVM device can process custom commands (i.e., commands that are not part of a standard), the NVM device may also process commands that are the same or similar to those of an existing standard. FIG. 6B shows an example of such commands.

FIG. 6B is a table 652 showing additional commands that can be processed by an NVM device. Table 652 includes the same columns as FIG. 5. The commands of FIG. 6B include a multi-purpose command, as well as mode register write and read commands. In some embodiments, a parallel port (e.g., 410 in FIG. 4) can be a read-write port, and mode register command can be used to set port accesses to a bank (e.g., 414-0 to -7 in FIG. 4). In addition or alternatively, one or more custom commands like those of FIG. 6A can be used to establish bank access via a parallel port.

FIG. 7 is a table 728 showing a bank access value register according to an embodiment. A bank access register can control access to banks in an NVM device, like that shown in FIG. 4. Table 728 includes a FIELD column, which identifies a bank; a TYPE column, which indicates a type of access; a DEFAULT column which indicates default values; and a DEFINITION column which indicates what a bank access value means. As shown, bank access values can have a default value of "0", which enables access via a serial interface (e.g., SPI) but not a parallel interface (e.g., LPDDR4). Such an access can include both reads and writes (R/W).

When a bank access value is "1", it enables access via a parallel interface but not a serial interface. Further, a TYPE of access may be limited to read (R and not R/W).

Figure 8:
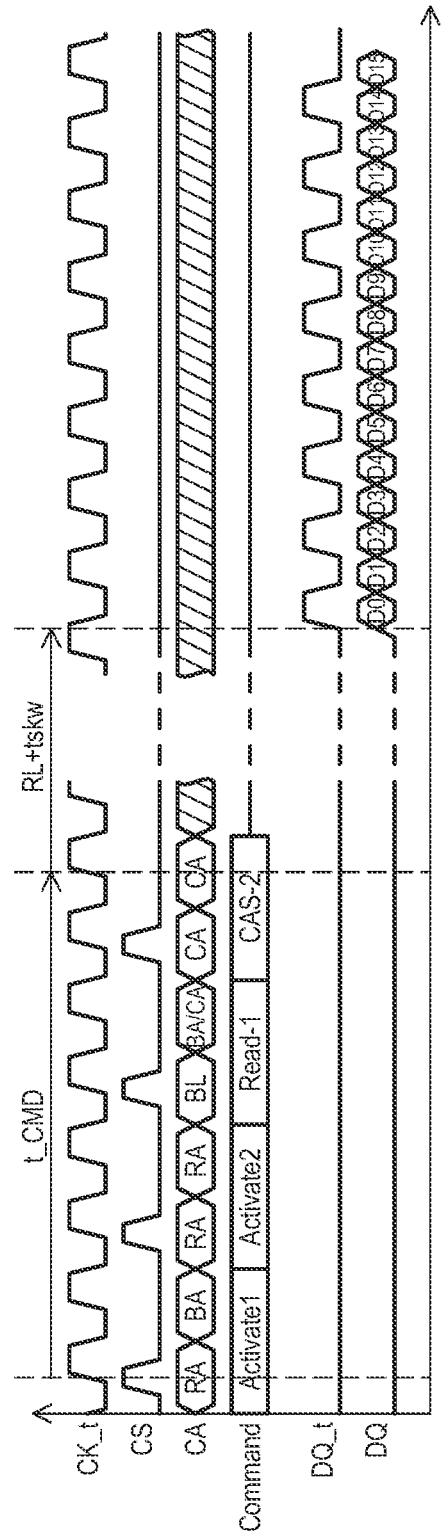
FIG. 8 is a timing diagram showing a conventional LPDDR4 read operation.

FIG. 8 is a timing diagram showing a conventional LPDDR4 read access. FIG. 8 includes waveforms for an input clock (CK_t), a chip select CS, command-address values (CA), corresponding commands (Command) (generated by the CA values), a data clock DQ_t, and data values DQ, which are understood to be sets of parallel data values (e.g., bytes, words, doublewords, etc.).

As shown, four commands (Activate1-Activate2-Read-1-CAS-2) can be received at the LPDDR4 interface over a time t_CMD. Accordingly, a conventional LPDDR4 command sequence can occupy seven CK_t cycles. Following a read latency and clock skew time period (RL+tskw), data (DQ) can be output at a double data rate in synchronism with a data clock (DQS). The data can be output in burst sequence of sixteen.

Figure 9A:
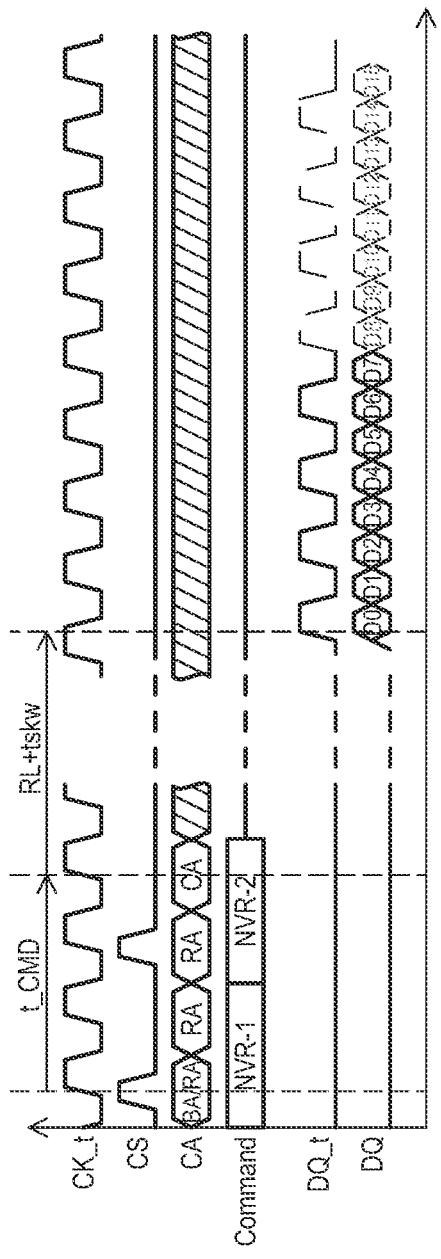
FIG. 9A is a timing diagram showing a fast read operation over an LPDDR4 port of an NVM device according to an embodiment.

According to embodiments, read accesses to banks of NVM cells can be made over a DDR interface with only two commands. FIG. 9A shows an example of such an embodiment.

FIG. 9A is a timing diagram showing a read access over an LPDDR4 interface according to an embodiment. FIG. 9A includes the same types of waveforms as shown in FIG. 8. However, custom read commands can make accesses faster than a standard LPDDR4 sequence. As shown, two commands (NVR-1-NVR-2) can be received at the LPDDR4 interface over three cycles of CK_t. Following a read latency and clock skew time period (RL+tskw) data (DQ) can be output at a double data rate in synchronism with a data clock (DQS). In the embodiment shown, the data can be output in a burst sequence of eight or greater (e.g., 16).

In some embodiments, a read latency (RL) for access to NVM cells can be accomplished at very high speeds, less than 20 ns or about 17.5 ns. A tskw value can be less than 4 ns, or about 2.5 ns. Accordingly, for a clock (CK_t) speed of 800 MHz, from the latching of a first command portion to the output of data can be as little as 19 clock cycles (t_CMD=3 cycles, RL=14 cycles, tskw=2 cycles).

A fast command sequence, like that shown in FIG. 9A can enable rapid accesses to be performed one after the other. According to some embodiments, consecutive read operations to different banks can enable an uninterrupted sequence of output data values. Such an embodiment is shown in FIG. 9B.

Figure 9B:
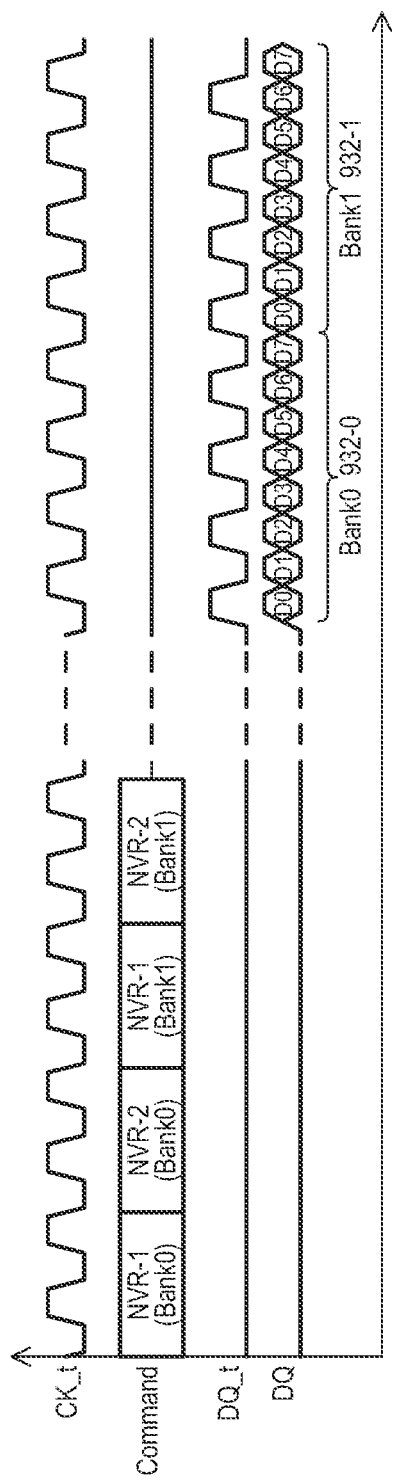
FIG. 9B shows consecutive read operations to different banks of an NVM device for uninterrupted data bursts according to an embodiment.

FIG. 9B is a timing diagram showing consecutive read accesses according to an embodiment. A first read access can be made to one bank (Bank0) with a two command sequence (NVR-1-NVR2). A second read access can be made to a different bank (Bank1) with another two command sequence. In response to such a sequence of read commands, data can be output in two consecutive bursts 932-0 and 932-1. Such burst can be without interruption, enabling extremely fast reading of data from the NVM device, as compared to conventional NVM devices.

According to embodiments, while high throughput accesses to NVM banks can be made through a parallel interface, NVM accesses can also be made through a serial interface. Further, accesses to different banks can occur at the same time from both such interfaces.

Figure 10A:
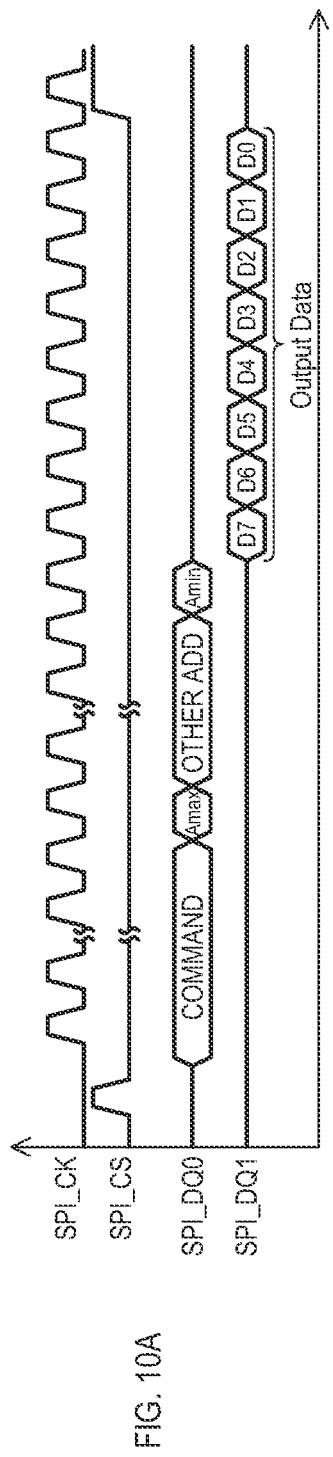
FIGS. 10A to 10C are timing diagrams of various operations over a SPI port for a NVM device according to embodiments.
Figure 10B:
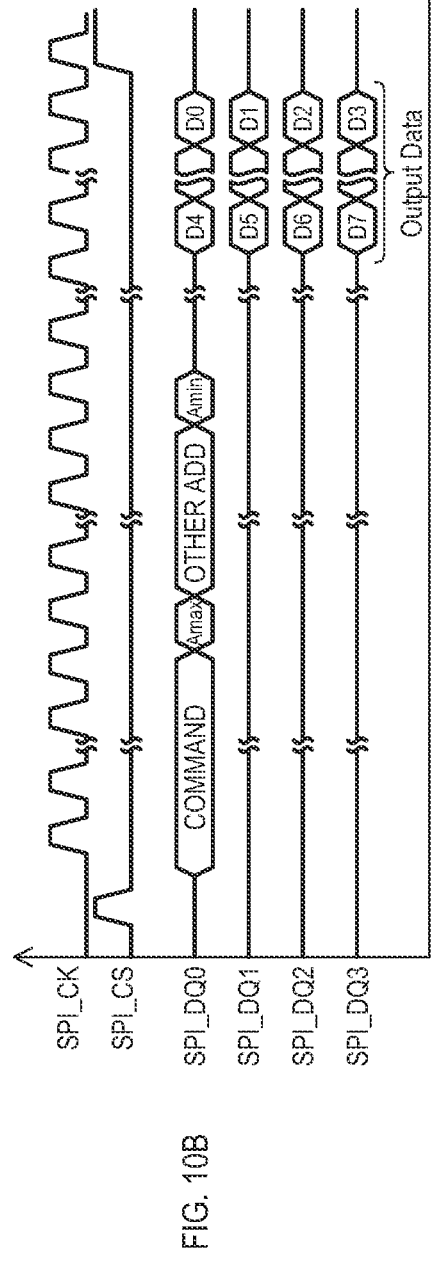
Figure 10C:
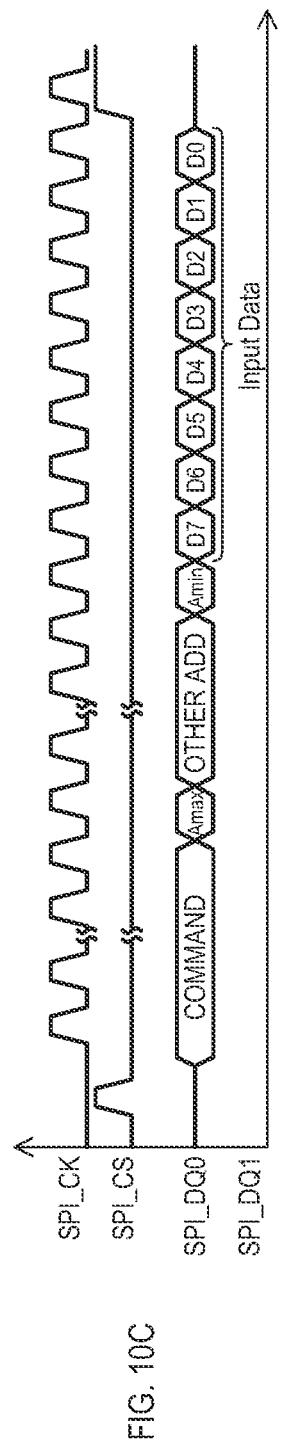

FIGS. 10A to 10C are timing diagrams showing serial port accesses that can be included in embodiments. FIG. 10A includes waveforms for a serial clock (SPI_CK), a chip select (SPI_CS), a first serial I/O (SPI_DQ0), and a second serial I/O (SPI_DQ1). FIG. 10A shows one example of a serial data read operation. In response to SPI_CS going active (low in this example), command values (COMMAND) can be received on SPI_DQ0 as a sequence of bit values in synchronism with SPI_CK. COMMAND can indicate a read operation. Address bit values (Amax to Amin) can follow and can indicate a NVM bank and locations within the NVM bank. Output data (D7-D0) can be provided on SP_DQ1 in synchronism with SPI_CK.

FIG. 10A shows an example of a no latency read operation. Read data can be output on SPI_DQ1 on the next clock cycle following a last address bit value (Amin). However, alternate embodiments can include a longer read latency. Further, while FIG. 10A shows an eight bit read data output, alternate embodiments can have a much longer sequence of read data.

FIG. 10B shows another example of a serial data read operation. FIG. 10B can include an operation like that of FIG. 10A, however, data can be output at a quad serial rate. In response to a command and address values as in FIG. 10A, following a read latency, serial data can be output on four serial I/Os (SPI_DQ0 to SPI_DQ3).

FIG. 10C shows an example of a serial data write operation. Command, address, and write data values can be received in sequence on a serial I/O SPI_DQ0.

As noted herein, any of the accesses in FIGS. 10A to 10C (and equivalent accesses) can occur at the same time as LPDDR4 accesses (shown in FIGS. 9A and 9B), provided they are to different NVM banks.

While embodiments can include methods as disclosed explicitly and inherently in the above embodiments, additional methods will now be described.

Figure 11:
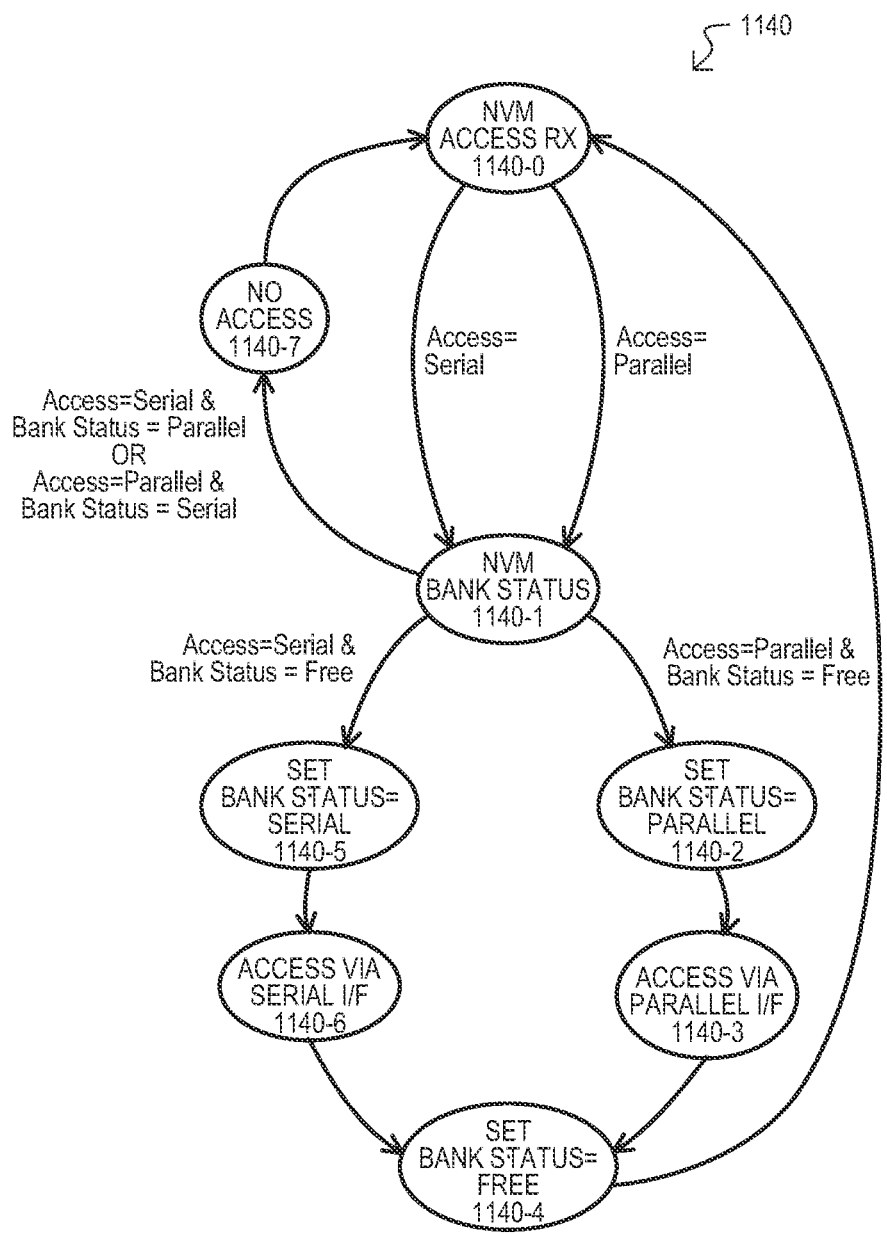
FIG. 11 is a state diagram showing bank access operations over a parallel and serial port of an NVM device according to an embodiment.

FIG. 11 is a state diagram of a method 1140 for controlling bank access of a NVM device from two different interfaces. A method 1140 can include receiving an access request at the NVM device 1140-0. An access type can be a parallel access (e.g., an access received at a parallel port or interface) (Access=Parallel) or an access type can be a serial access (e.g., an access received at a serial port or interface) (Access=Serial). An access can be directed to one of a number of different banks on the NVM device. In some embodiments, parallel access can be read only, while serial accesses can be read or write (e.g., program).

Regardless of the type of access request, a status of the NVM bank can be determined 1140-1. In the embodiment shown, if the access is a parallel access and the bank status is free (Access=Parallel & Bank Status=Free), the bank status for the bank can be set to parallel 1140-2. An access via the parallel port/interface can occur 1140-3. Once the access via the parallel port is complete, the status of the access bank can be set to free 1140-4.

If the access is a serial access and the bank status is free (Access=Serial & Bank Status=Free), the bank status for the bank can be set to serial 1140-5. An access via the serial port/interface can occur 1140-6. Once the access via the parallel port is complete, the status of the access bank can be set to free 1140-4.

If the access is a serial access and the bank status is parallel (Access=Serial & Bank Status=Parallel) or the access is a parallel access and the bank status is serial (Access=Parallel & Bank Status=Serial), the bank is not accessed 1140-7.

Figure 12:
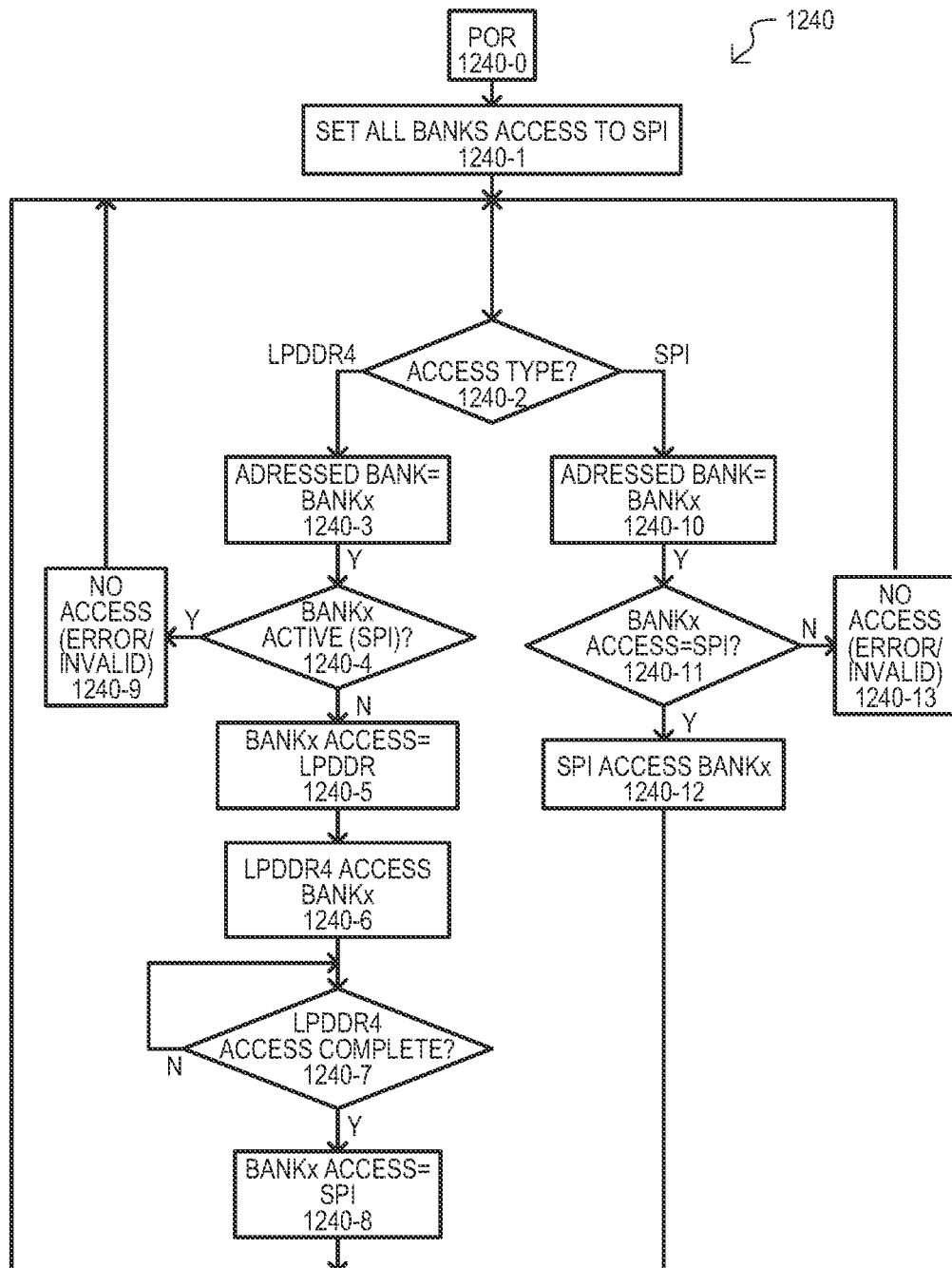
FIG. 12 is a flow diagram showing bank access operations over a LPDDR4 and SPI port of an NVM device according to an embodiment.

FIG. 12 is a flow diagram of an method 1240 for controlling access to banks of a NVM device having a SPI port and a LPPDR4 port. It is assumed the NVM device sets bank access values to enable or prevent access to each bank.

A method 1240 can include determining a power-on or reset condition (POR) 1240-0 for a NVM device. In the event of the POR, an NVM device can set all bank access values to a default value 1240-1. In the embodiment shown, a default value can be SPI access. However, in alternate embodiments default values can be some other value. Further, default bank accesses values need not be the same for all banks.

An access to a bank can be received 1240-2. If an access is via a LPDDR4 port (LPDDR4 from 1240-2), an addressed bank can be determined 1240-3. Such an action can include decoding an address received with an access request on multiple command-address inputs. In some embodiments, a LPDDR4 port can be a read only port, and write accesses can be ignored. A status of an addressed bank can be determined 1240-4. In particular, it can be determined if the addressed bank is being accessed via the SPI port (or otherwise not available). If the bank is indicated as available (N from 1240-4), a bank access value for the bank can be set to LPDDR4 1240-5, indicating the bank is being accessed (or scheduled to be accessed) by the LPDDR4 port. In some embodiments, such an action can include setting a register value in a bank access register.

The addressed bank can then be accessed via the LPDDR4 port 1240-6. While such an access continues (N from 1240-7), the bank access value can remain set to LPDDR4. However, once the access is complete (Y from 1240-7), the bank access value for the addressed bank can be returned to SPI 1240-8.

If there is a LPDDR4 port access request, and the bank access value indicates the bank is not available (e.g., SPI access is, or will occur) (Y from 1240-4), the bank may not be accessed 1240-9. In some embodiments, such an action can include returning invalid data in response to the request (e.g., all bits zero), generating an interrupt and/or writing to status registers. However, any other suitable response can be generated, including generating no response (e.g., ignoring the request).

If an access is via a SPI port (SPI from 1240-2), an addressed bank can be determined 1240-10. Such an action can include decoding an address received with an access request as a series of bits on one or more serial I/O lines. A SPI port can be a read-write port allowing data to be read from or written into (e.g., programmed) the address block. A status of an addressed bank can then be determined 1240-11. If the bank is indicated as having SPI access (Y from 1240-11), the addressed bank can be accessed via the SPI port 1240-12. If the bank access value indicates no SPI access (e.g., the bank access value is set to LPDDR4) (N from 1240-11), the bank may not be accessed 1240-13. Such an action can include generating various response noted above for 1240-9, including ignoring the request.

Figure 13:
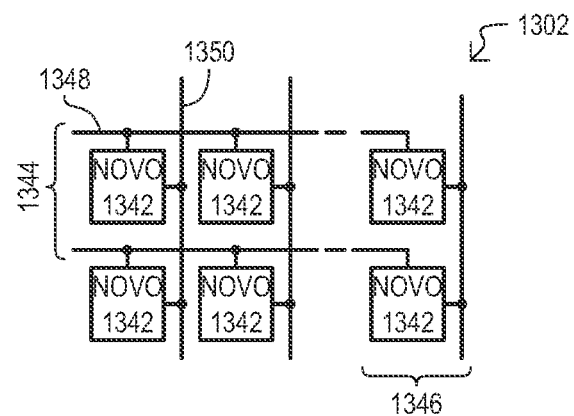
FIG. 13 is a schematic diagram of a NVM cell array that can be included in embodiments.

Embodiments can include banks of NVM cells in any suitable type and/or arrangement. FIG. 13 shows an arrangement of NVM cells in a bank that can be included in embodiments. Such an arrangement should not be construed as limiting. FIG. 13 shows a NVM array 1302 having NVM cells 1342 arranged into rows (one row shown as 1344) and columns (one column shown as 1346). NVM cells 1342 of a same rows 1344 can be commonly connected to a same wordline WL (one WL shown as 1348). NVM cells 1342 of a same column 1346 can be commonly connected to a same bitline BL (one BL shown as 1354).

Embodiments can include NVM arrays 1302 arranged into larger groups. As but one example, WLs of different arrays can be connected together with global WLs and/or BLs of different arrays can be connected together with global BLs.

Figure 14:
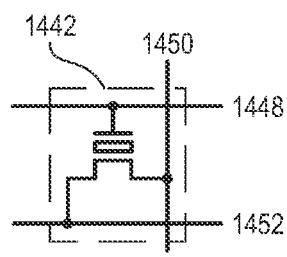
FIG. 14 is a diagram of a NVM cell that can be included in embodiments.

Embodiments can include NVM cells of any suitable type. FIG. 14 shows an example of an NVM cell that can be included in embodiments. Such an example should not be construed as limiting. FIG. 14 shows one-transistor (1T) NVM cell 1442 having a gate connected to a word line 1448, a drain connected to BL 1454, and a source connected to a source line 1456. NVM cell 1442 can store charge to control a threshold voltage of its corresponding transistor. In some embodiments, NVM cell 1442 can include a charge storage layer between a control gate an channel. Such a charge storage layer can take any suitable form, including but not limited to a dielectric, dielectric interface, or floating conductor.

Figure 15:
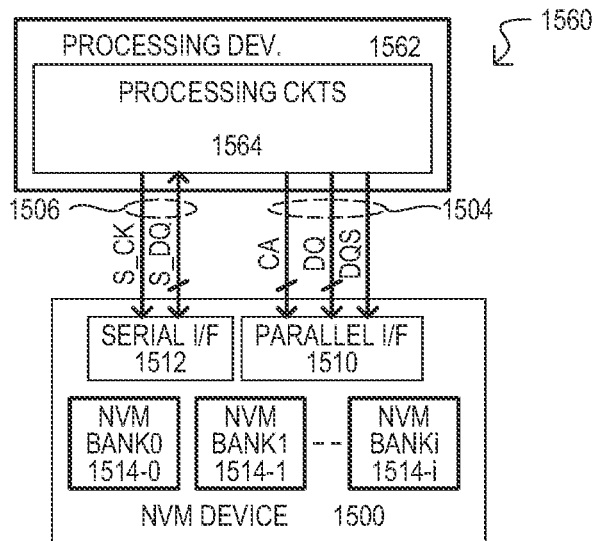
FIG. 15 is a block diagram of a system according to an embodiment.

While embodiments can include various devices and methods, embodiments can also include systems in which a processing device accesses an NMV device. FIG. 15 is a block diagram of a system 1560 according to an embodiment. A system 1560 can include a processing device 1562 and a NVM device 1500. A processing device 1562 can include processing circuits 1564 and can access NVM device 1500 over a parallel port 1504 and a serial port 1506. Processing circuits can include any suitable processing circuits including but not limited to one or more processor cores, fixed logic, programmable logic, and combinations thereof.

NVM device 1500 can include a number of NVM banks 1514-0 to -i, a parallel I/F 1510 connected to parallel port 1504 and a serial I/F 1512 connected to serial port 1512. NVM device 1500 can take the form of and/or operate in the same fashion as any of the NVM devices described herein and equivalents.

Figure 16:
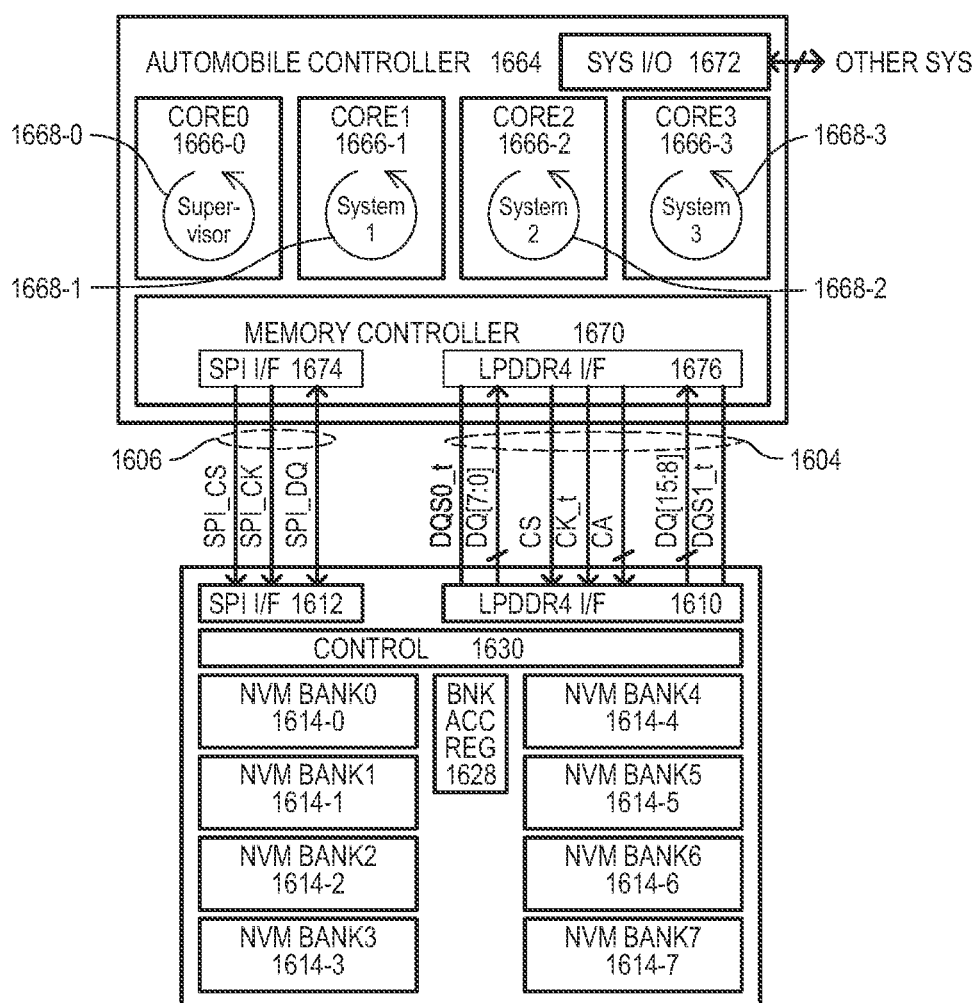
FIG. 16 is a block diagram of an automobile control system according to an embodiment.

FIG. 16 is a block diagram of an automobile control system 1660 according to an embodiment. System 1660 can be one example of that shown in FIG. 15. System 1660 can include processing cores 1666-0 to -3, memory controller 1670 and system I/Os 1672. Cores (1666-0 to -3) can include processors and associated circuits (e.g., cache memory, buses, etc.). In some embodiments, some cores (1666-1 to -3) can be dedicated to processing tasks (1668-1 to -3) for one or more systems of an automobile, while one or more other cores can execute a supervisory function 1668-0 to oversee and/or monitor the various operations of the system 1660.

A memory controller 1670 can include a SPI I/F 1674 connected to a SPI port 1606 and a controller side LPDDR4 I/F 1676 connected to a unidirectional (e.g., read only) LPDDR4 port 1604.

System I/Os 1672 can be connected to various automobile systems to receive data from and/or transmit data to such other automobile systems. System I/Os can include interfaces for any suitable bus system, including but not limited the Controller Area Network (CAN) type buses.

NVM device 1600 can include a SPI I/F 1612, LPDDR4 I/F 1610, control circuits 1630, a number of separately accessible NVM banks 1614-0 to -7, and a bank access register 1628. NVM device 1500 can take the form of and/or operate in the same fashion as any of the NVM devices described herein and equivalents.

Figure 17:
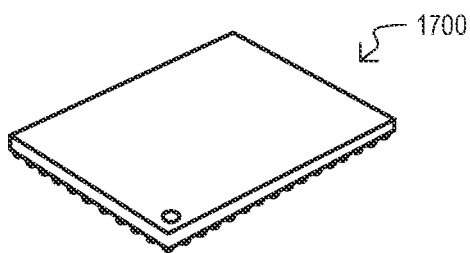
FIG. 17 is diagram of an integrated circuit device according to an embodiment.

While embodiments can include systems with various interconnected components, embodiments can also include unitary devices which can provide nonvolatile storage with rapid double data rate read access over a parallel port, while at the same time providing read and write access via a serial port. Such unitary devices can be advantageously compact single integrated circuit devices. FIG. 17 show one particular example of a packaged NVM device 1700. Such a NVM device 1700 can include any of the features of the other NVM devices disclosed herein or equivalents. However, it is understood that a NVM device according to embodiments can include any other suitable integrated circuit packaging type, as well as direct bonding of a NVM device chip onto a circuit board or substrate.

Figure 18:
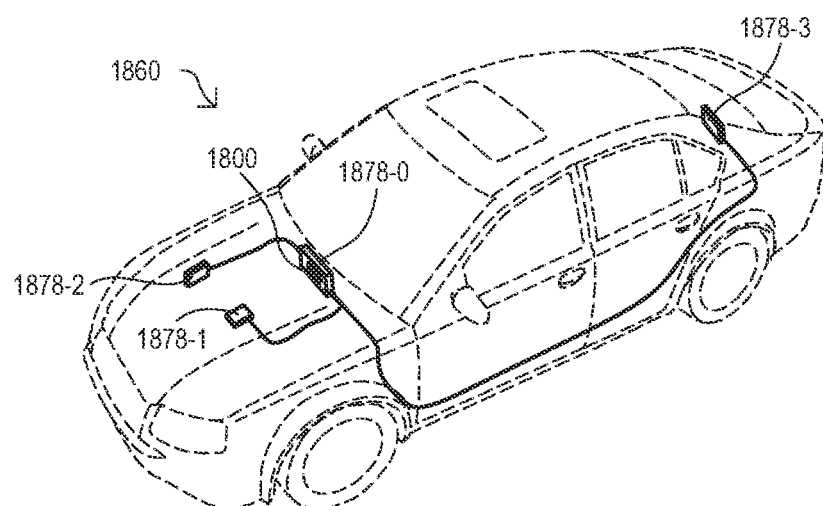
FIG. 18 is diagram of an automobile system according to an embodiment.

FIG. 18 shows an automobile system 1860 according to an embodiment. Automobile 1860 can have numerous subsystems, including but not limited to a main control subsystem 1878-0, engine—power train control system 1878-1, a suspension-tire control system 1878-2, a body control system 1878-3. A main control subsystem 1878-0 can include a NVM device 1800 according to embodiments disclosed herein, or equivalents. A main control subsystem 1878-0 can control infotainment functions (navigation, communication, entertainment devices, data storage, digital audio broadcast) as well as supervisory monitoring of all other systems. In some embodiments, a main control subsystem 1878-0 can be one implementation of that shown in FIG. 16. In such an arrangement, processing devices can have high throughput access to data stored on NVM device 1800 via a DDR interface, while at the same time providing data write and read functions over a slower data throughput serial interface.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A memory device, comprising:
   a first port of a first type including:
      a first clock input;
      at least one first command address input configured to receive command and address information; and
      at least one data input or output configured to transfer data in relation to the memory device;
   a second port of a second type including:
      a second clock input;
      at least one command, address, and data input/output (I/O) configured to receive command and address information from, and to transfer data in relation to the memory device;
   a memory including a plurality of banks, wherein each bank is configurable for access by the first port or the second port based on an access value, and wherein a first bank and a second bank of the plurality of banks are accessible respectively by the first and second ports at least in part concurrently based on their respective access values; and
   a bank access register configured to store the access value of each bank of the memory.

2. The memory device of claim 1, wherein the first port includes at least one parallel port and the at least one data input or output includes parallel data inputs/outputs (I/Os) configured to send data to write to the plurality of banks during write operations and receive read data from the plurality of banks during read operations of the memory device.

3. The memory device of claim 1, wherein the first port includes at least one parallel port and the at least one data input or output includes unidirectional data outputs configured to output read data from the memory device in parallel.

4. The memory device of claim 1, wherein the first port is compatible with at least a portion of a low power DDR interface (LPDDR) standard.

5. The memory device of claim 1, wherein when a bank of the plurality of banks is configured for access by the first port, the bank is not accessible by the second port.

6. The memory device of claim 1, wherein the second port includes at least one serial port and the at least one command, address, and data I/O includes serial data inputs/outputs (I/Os) configured to send data to write to the plurality of banks during write operations and receive read data from the plurality of banks during read operations of the memory device.

7. The memory device of claim 3, wherein the second port includes at least one serial port and the at least one command, address, and data I/O includes serial data inputs/outputs (I/Os) configured to send data to write to the plurality of banks during write operations and receive read data from the plurality of banks during read operations of the memory device.

8. The memory device of claim 1, wherein the second port is compatible with a Serial Peripheral Interconnect (SPI) standard.

9. The memory device of claim 1, wherein the memory includes non-volatile memory cells.

10. A system, comprising:
a processing device; and
a memory device, coupled to the processing device, including:
  a first port coupled to a first interface configured to receive command, address, and write data from, and to transmit read data to the processing device;
  a read/write parallel port coupled to a parallel double data rate (DDR) interface configured to receive command, address, and write data from, and to transmit read data to the processing device;
  a non-volatile memory (NVM) array including a plurality of banks, wherein each bank is configured for access based on a corresponding access value, and wherein two different banks of the plurality of banks are configured to enable access respectively by the first port and the read/write parallel port concurrently; and
  a bank access register configured to store the corresponding access value for each bank of the plurality of banks.

11. The system of claim 10, wherein each bank of the plurality of banks is configured to enable access by only one of the first interface or the parallel DDR interface in a same time period.

12. The system of claim 10, wherein the first port includes a serial read/write port, the first interface is a Serial Peripheral Interconnect (SPI) interface compatible with a SPI standard.

13. The system of claim 10, wherein the first port includes a read-only parallel port and the first interface is a unidirectional parallel DDR interface.

14. The system of claim 10, wherein the parallel DDR interface is compatible with at least a portion of a low power DDR interface (LPDDR) standard.

15. The system of claim 10, wherein the processing device comprises one or more cores configured to control different parts of an automobile.

16. The system of claim 10, wherein the memory device further comprises a logic element configured to set access values for at least one bank in response to command and address information received from the processing device via the first interface and the parallel DDR interface.

17. A method of operating a non-volatile memory (NVM) device, comprising:
receiving a first access command and address information to a first memory bank through a first port of the NVM device;
setting, by a logic element in the NVM device based at least partly on the first access command and address information, a first access value stored in a bank access register for the first memory bank;
enabling access to the first memory bank via the first port based at least partly on the first access value;
receiving a second access command and address information to a second memory bank through a second port of the NVM device;
setting, by the logic element based at least partly on the second access command and address information, a second access value stored in the bank access register for the second memory bank;
and
enabling concurrent access to the second memory bank via the second port based at least partly on the second access value when the first memory bank is being accessed via the first port, wherein the first memory bank is different from the second memory bank.

18. The method of claim 17, wherein the first port is a parallel port and the second port is a serial port.

19. The method of claim 17, wherein the first port is a unidirectional parallel port configured for data output from the NVM device and the second port is a parallel port.

20. The method of claim 17, further comprising:
disabling access to the first memory bank via the second port when the first memory bank is being accessed via the first port; and
disabling access to the second memory bank via the first port when the second memory bank is being accessed via the second port.

* * * * *